US008065704B2

(12) United States Patent
Zhang et al.

(10) Patent No.: US 8,065,704 B2
(45) Date of Patent: Nov. 22, 2011

(54) METHOD, SERVER, TERMINAL, AND SYSTEM FOR UPDATING MODIFIED ELECTRONIC SERVICE GUIDE DATA

(75) Inventors: Jie Zhang, Shenzhen (CN); Chuxiong Zhang, Shenzhen (CN)

(73) Assignee: Huawei Technologies Co., Ltd, Shenzhen (CN)

(*) Notice: Subject to any disclaimer, the term of this patent is extended or adjusted under 35 U.S.C. 154(b) by 479 days.

(21) Appl. No.: 12/345,194

(22) Filed: Dec. 29, 2008

(65) Prior Publication Data

US 2009/0112944 A1 Apr. 30, 2009

Related U.S. Application Data

(63) Continuation of application No. PCT/CN2008/070074, filed on Jan. 10, 2008.

(30) Foreign Application Priority Data

Apr. 3, 2007 (CN) .......................... 2007 1 0087397

(51) Int. Cl.
*H04N 5/445* (2011.01)
*G06F 9/44* (2006.01)
(52) U.S. Cl. ........... 725/50; 717/170; 717/171; 717/172
(58) Field of Classification Search .................. 725/50; 717/168–173
See application file for complete search history.

(56) References Cited

U.S. PATENT DOCUMENTS 7,904,900 B2 * 3/2011 Forsyth .......................... 717/178
2005/0022237 A1   1/2005 Nomura

FOREIGN PATENT DOCUMENTS

| CN | 1444393 A | 9/2003 |
|---|---|---|
| CN | 1640130 A | 7/2005 |
| WO | 2006/012378 A1 | 2/2006 |
| WO | 2006/059209 A1 | 6/2006 |

OTHER PUBLICATIONS

International Preliminary Report on Patentability issued in corresponding PCT Application No. PCT/CN2008/070074; issued Oct. 6, 2009.
Office Action issued in Chinese Patent Application No. 200710087397.2; issued in Jun. 26, 2009.
"IP Datacast Over DVB-H:Electronic Service Guide (ESG)" DVB Document, XX, XX, vol. A0099, Nov. 1, 2005, pp. 49-70.
Search Report issued in corresponding European Patent Application No. 08 70 0098; issued Jul. 15, 2009.
International Search Report issued in corresponding PCT Application PCT/CN2008/070074; mailed Apr. 17, 2008.

* cited by examiner

*Primary Examiner* — Hoang-Vu A Nguyen-Ba
(74) *Attorney, Agent, or Firm* — Brinks Hofer Gilson & Lione (57) ABSTRACT

A method for updating an electronic service guide (ESG) that includes sending version information of the ESG currently maintained by the server along with ESG data to a terminal. When the server receives an ESG request carrying second version information from the terminal, the server compares the first version information with the second version information and if the first version information differs from the second version information, the server sends the first version information and the ESG data that is related to the ESG requested by the terminal and updated relative to the ESG corresponding to the second version information to the terminal. The present disclosure also discloses a system for updating an ESG, an ESG server and a terminal. With the present disclosure, ESG update is more specific and processing load of the terminal is reduced.

20 Claims, 4 Drawing Sheets

METHOD, SERVER, TERMINAL, AND SYSTEM FOR UPDATING MODIFIED ELECTRONIC SERVICE GUIDE DATA

CROSS REFERENCES TO RELATED APPLICATIONS

The present application is a continuation application of PCT/CN2008/070074, filed Jan. 10, 2008, which claims the benefit of Chinese Patent Application No. 200710087397.2, filed Apr. 3, 2007, both of which are hereby incorporated by reference in their entirety.

FIELD OF THE DISCLOSURE

The present disclosure relates to mobile video broadcast technologies, and in particular, to a method for updating an electronic service guide (ESG), and an ESG server, terminal and system.

BACKGROUND OF THE DISCLOSURE

Mobile video broadcast is a new mobile service that transfers video contents to mobile users via broadcast networks, mobile communication networks, and mobile terminals.

The electronic service guide (ESG) is an important application of the mobile video broadcast service. ESG data provides a direct user interface and access guide for a user to view data related to different services. With an ESG, a user can browse the video channel and program list, browse the price list, select and buy one or more items in the price list, and log in to a website to browse web pages. ESG data includes the ESG and fragments, where the ESG is composed of different types of fragments according to their internal logical relations. Normally, information of one program is related to multiple fragments so that ESG data is processed on both the server and terminal sides using a fragment based mechanism.

A user may obtain ESG data in multiple modes, one of which is to obtain ESG data via an interactive channel. In the prior art, TV-Anytime (TV-A) and broadcast (BCAST) protocols define a method for transporting ESG data via the interactive channel.

Figure 1:
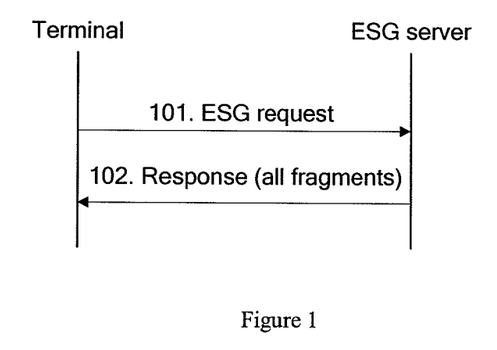
FIG. 1 shows a signaling procedure for transporting an ESG via an interactive channel.

FIG. 1 shows a signaling interaction procedure for transporting the ESG via an interactive channel. As shown in FIG. 1, the signaling procedure includes the following steps:

Step 101: A terminal sends an ESG request to an ESG server.

Step 102: The ESG server sends a response to the terminal, the response carrying all fragments related to the ESG requested by the terminal.

Now, the procedure for transporting the ESG via an interactive channel is completed.

After a period of time, some fragments stored in the terminal may already be updated in the server. At this time, the terminal wishes to update the fragments stored in the terminal locally. In the prior art, the terminal can only send another ESG request to the ESG server according to the method shown in FIG. 1 and the ESG server will send all fragments related to the ESG requested by the terminal to the terminal. Actually, however, it is possible that no fragments stored in the terminal are updated in the server or most fragments stored in the terminal are consistent with the fragments stored in the server without being updated. It is unnecessary for the ESG server to send fragments that are not updated to the terminal. The ESG update method in the prior art is not specific, therefore unnecessary transport exists in an ESG update process, which adds to the processing load of the terminal.

SUMMARY OF THE DISCLOSURE

In view of the defects of the prior art, an embodiment of the present disclosure provides a method for updating an electronic service guide (ESG) so as to make ESG update more specific and reduce the processing load of a terminal.

The method for updating an ESG includes receiving an ESG request message carrying second version information from a terminal, and sending ESG data that is updated relative to an ESG corresponding to the second version information according to the ESG request message to the terminal and sending the first version information which is maintained by a server to the terminal when the first version information is different from the second version information.

Another embodiment of the present disclosure also provides a method for updating an ESG that includes sending an ESG request message carrying second version information to a ESG server, receiving ESG data which is sent by the ESG server according to the EST request message and is updated relative to an ESG corresponding to the second version information; and receiving first version information which is maintained by a server.

An embodiment of the present disclosure provides an ESG server enabling an ESG update to be made more specific thereby reducing the processing load of a terminal.

The ESG server includes a version maintenance module, adapted to maintain first version information of an ESG, a first communication module, adapted to receive an ESG request message carrying second version information, a first request processing module, adapted to obtain ESG data that is updated relative to an ESG corresponding to the second version information according to the ESG request message and send the obtained ESG data and the first version information via the first communication module.

An embodiment of the present disclosure also provides a terminal enabling an ESG update to be made more specific thereby reducing the processing load of a terminal.

The terminal includes a second communication module, a second request processing module and a second storage module, where the second communication module is adapted to generate an ESG request message carrying second version information, the second communication module is adapted to receive fragments and first version information, and the second storage module is adapted to store the fragments and the first version information. An embodiment of the present disclosure also provides one or more computer readable media comprising logic encoded in the computer readable media, the logic, when executed, operable to implement a method that comprises receiving an ESG request message carrying second version information from a terminal, and sending, according to the ESG request message, ESG data that is updated relative to an ESG corresponding to the second version information to the terminal, and sending first version information which is maintained by a server to the terminal when the first version information is different from the second version information.

In the technical solution disclosed in embodiments of the disclosure, a server maintains the first version information of ESG data and sends version information of the ESG currently maintained by the server along with ESG data to the terminal. When the server receives an ESG request carrying second version information from the terminal, the server compares the first version information with the second version information and if the first version information differs from the second version information, the server sends the first version information and the ESG data that is related to the ESG requested by the terminal and updated relative to the ESG corresponding to the second version information to the terminal. Thus, the server only sends ESG data that is updated to the terminal in the ESG update process so that ESG update is more specific and the processing load of the terminal is reduced.

DETAILED DESCRIPTION OF THE DISCLOSURE

For better understanding of the purpose, technical solution and advantages of the disclosure, the present disclosure is hereinafter described in detail with reference to the embodiments and accompanying drawings.

Figure 2:
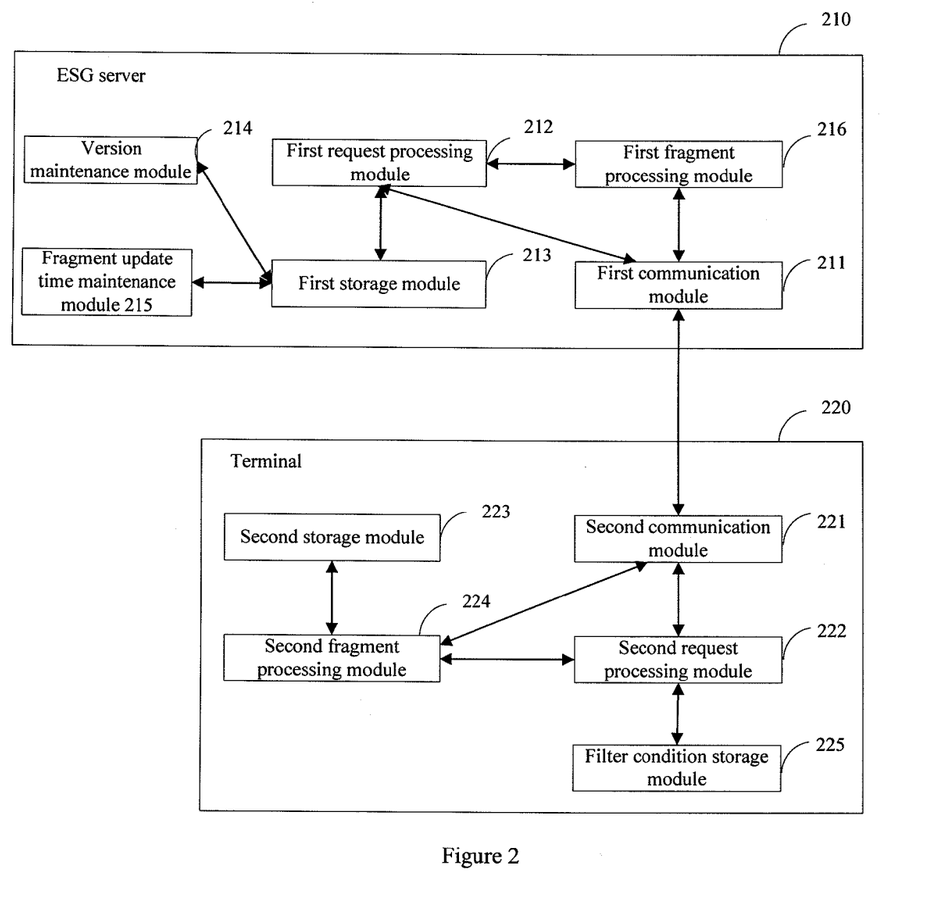
FIG. 2 shows the structure of a system for updating an ESG according to a first embodiment of the disclosure.

FIG. 2 shows the structure of a system for updating an ESG according to a first embodiment of the disclosure. As shown in FIG. 2, the system includes an ESG server 210 and a terminal 220. The ESG server 210 includes a first communication module 211, a first request processing module 212, a first storage module 213 and a version maintenance module 214. The terminal 220 includes a second communication module 221, a second request processing module 222, and a second storage module 223.

The version maintenance module 214 of the ESG server 210 shown in FIG. 2 is adapted to maintain version information of the ESG in the ESG server 210. This version information is referenced as the first version information herein. The first version information in the embodiment is information that identifies the ESG version or the latest update time of the ESG, represented by the absolute time of the server, a conversion/combination of the absolute time of the server, or a symbol that identifies the new or old version. Furthermore, the first version information is the current latest version information of the ESG maintained by the ESG server.

In this embodiment of the disclosure, suppose the second storage module 223 of the terminal 220 already stores the second version information, which, like the first version information, is information that identifies the ESG version or the latest update time of the ESG, represented by the absolute time of the server, a conversion/combination of the absolute time of the server, or a symbol that identifies the new or old version. The second version information is different from the first version information in that the second version information is ESG version information stored by the terminal and may not be the current latest version information of the ESG maintained by the ESG server. In this embodiment of the disclosure, the terminal 220 may request the part of ESG data that is updated relative to the ESG corresponding to the second version information from the ESG server according to the second version information.

Preferably, the method may set one or more default values for the second version information and may set which ESG data to send to the terminal when the ESG request message received by the server carries second version information with the default value. For example, a default value may be set, indicating that the server should send all data related to the ESG requested by the terminal to the terminal. Then, the terminal may use this default value as the second version information when requesting an ESG from the server for the first time.

The working principle of the ESG system shown in FIG. 2 is: The second request processing module 222 in the terminal 220 generates an ESG request message carrying second version information and the second communication module 221 sends the generated ESG request to the first communication module 211 in the ESG server 210.

The first communication module 211 in the ESG server 210 sends the ESG request received from the terminal 220 to the first request processing module 212 for processing.

The first request processing module 212 in the ESG server 210 queries the first storage module 213 according to the ESG request received by the first communication module 211 to determine ESG data related to the ESG requested by the terminal 220 and updated relative to the ESG corresponding to the second version information, and sends the determined ESG data and the first version information to the second communication module 221 in the terminal 220 via the first communication module 211.

The second communication module 221 in the terminal 220 receives the ESG data and the first version information from the ESG server 210 and sends the ESG data and the first version information to the second storage module 223. Then ESG data and the second version information stored in the second storage module 223 are updated. In a next ESG update process, the updated second version information is used to send an ESG request message to the ESG server.

In the system shown in FIG. 2, the second storage module 223 in the terminal 220 may store received fragments as an ESG. The second storage module 223 may record the second version information in the ESG as a file attribute, or it may store the second version information in an independent text file or an over-the-air (OTA) download descriptor (DD) file.

In addition, the terminal 220 may further include a filter condition storage module 225. The ESG request message generated by the second request processing module 222 may carry a filter condition, which is stored in the filter condition storage module 225. When the terminal 210 sends another ESG request message carrying second version information to the ESG server 220, the filter condition and the second version information may be carried in the ESG request so that the ESG server returns fragments that are updated in the scope of fragments which the terminal wishes to update.

The ESG server 210 shown in FIG. 2 may further include a fragment update time maintenance module 215, adapted to modify the latest update time of fragments to the current absolute time of the server or a conversion/combination of the current absolute time of the server when a fragment is changed, added, or deleted. If the ESG server maintains the latest update time of fragments, the ESG server may use the latest update time of fragments in the ESG to indicate the first version information and the second version information.

The first request processing module 212 shown in FIG. 2 may further include an update judgment unit, adapted to determine fragments changed, fragments added, and/or fragments deleted after the server absolute time corresponding to the second version information, as fragments updated relative to the ESG corresponding to second version information, according to the second version information in the ESG request message.

Moreover, when the volume of ESG data is large, the ESG server may send the ESG data at multiple times. In this case, the ESG server 210 shown in FIG. 2 may further include a fragment processing module 216. The first fragment processing module 216 is adapted to construct a to-be-sent fragment list according to the fragment information of the ESG data obtained by the first request processing module 212 and send the to-be-sent fragment list via the first communication module 211. Therefore, the terminal 220 may request fragments required by the terminal from the ESG server 210 according to the to-be-sent fragment list so that fragments required by the terminal can be sent to the terminal at multiple times when the volume of ESG data is large.

Accordingly, the terminal 220 may further include a second fragment processing module 224. The second fragment processing module 224 is adapted to query the second storage module 223 according to the to-be-sent fragment list to determine fragments required by the terminal and send the fragments to the second request processing module 222. The second request processing module 222 in the terminal 220 is adapted to generate a fragment request message according to the fragments required by the terminal and send the request message to the ESG server 210.

The above describes the working principle of the system for updating the ESG shown in FIG. 2. In the system shown in FIG. 2, interactions between the ESG server 210 and the terminal 220 are generally implemented via a mobile communication network. Here, a mobile communication network may be: a Global System for Mobile Communications (GSM), a General Packet Radio Service (GPRS) network, or a Wideband Code Division Multiple Access (WCDMA) network. Messages exchanged between the server and the terminal may be transported over the Hypertext Transfer Protocol (HTTP), Wireless Application Protocol (WAP), short messages, or other effective channels.

On the basis of the ESG system shown in FIG. 2, an embodiment of the disclosure provides a method for updating an ESG. The following describes the method for updating an ESG in an embodiment of the disclosure.

Figure 3:
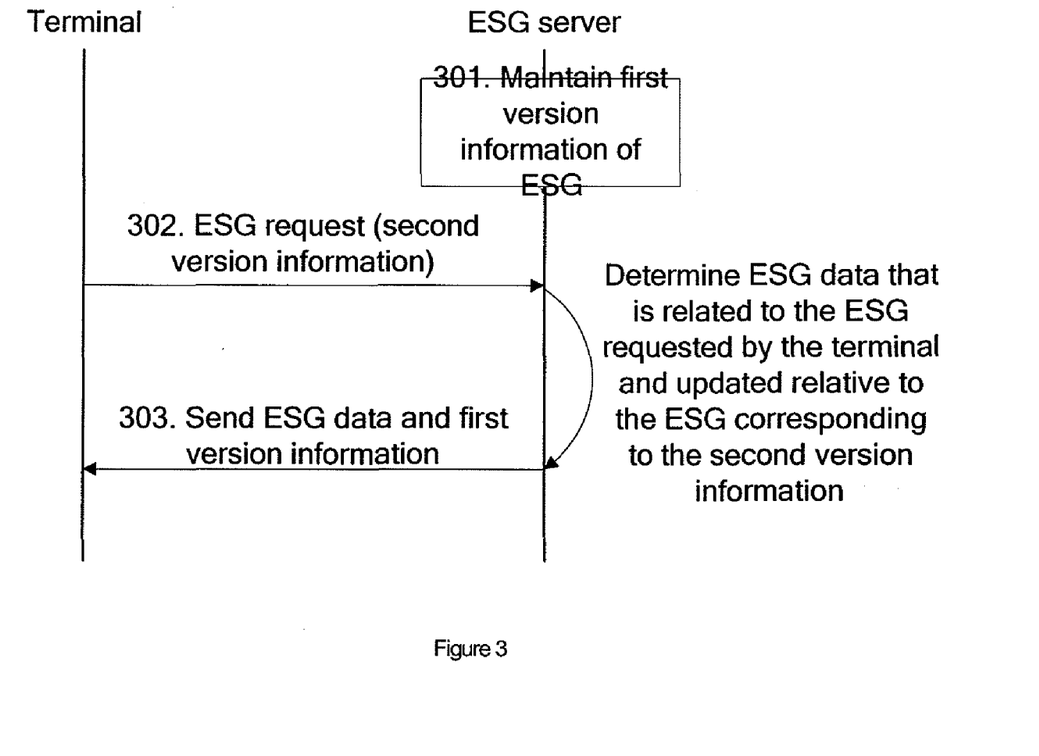
FIG. 3 shows a signaling procedure for updating an ESG according to an embodiment of the disclosure.

FIG. 3 shows a signaling procedure for updating an ESG according to an embodiment of the disclosure. As shown in FIG. 3, the signaling procedure includes the following steps:

Step 301: A server maintains first version information of an ESG

Step 302: The server receives an ESG request message carrying second version information from a terminal.

Step 303: If the first version information is different from the second version information, the server sends ESG data that is related to the ESG requested by the terminal and updated relative to the ESG corresponding to the second version information to the terminal and sends the first version information to the terminal.

After receiving the ESG data and the first version information, the terminal may replace locally stored ESG data with the updated ESG data and replace the locally stored second version information with the first version information. In a next ESG update process, the terminal may use the updated version information to construct an ESG request message and repeat step 302 and step 303 to complete the ESG update.

Now, the signaling procedure for updating an ESG in the embodiment of the disclosure comes to an end.

Preferably, in this embodiment of the disclosure, the method may set one or more default values for the second version information, and set which ESG data to send to the terminal when the ESG request message received by the server carries second version information with the default value. For example, a default value may be set, indicating that the server should send all data related to the ESG requested by the terminal to the terminal. Then, when requesting an ESG from the server for the first time, the terminal may use this default value as the second version information. When the server receives an ESG request message carrying second version information for requesting all ESG data, the server sends all ESG data related to the ESG requested by the terminal to the terminal.

In the embodiment of the disclosure, the first version information of the ESG maintained by the server is the latest version information. The second version information stored by the terminal is version information of the ESG when the terminal receives ESG data from the server last time. With the second version information, the server may determine ESG data updated relative to the ESG corresponding to the second version information and send the updated ESG data to the terminal so that ESG update is specific.

The ESG data updated relative to the ESG corresponding to the second version information may be all fragments in the ESG corresponding to the first version information, that is, the entire ESG. The ESG data updated relative to the ESG corresponding to the second version information may also be fragments in the ESG corresponding to the first version information that are updated relative to fragments in the ESG corresponding to the second version information, that is, partial fragments that are updated in the ESG.

To send the partial fragments updated in the ESG to the terminal, the server should maintain the latest update time of fragments in addition to maintaining the first version information of the ESG. Thus, with the second version information and the latest update time of fragments, the server may further determine fragments in the ESG corresponding to the first version information that are updated relative to fragments in the ESG corresponding to the second version information, so that the server may send only the partial fragments that are updated to the terminal instead of the entire ESG.

In the above embodiment of the disclosure, the server may describe the first version information and the second version information using the absolute time of the server, a conversion or combination of the absolute time of the server, or a symbol that identifies a new or old version. Considering the complexity in maintaining version information of fragments, preferably, the absolute time of the server, or a conversion or combination of the absolute time of the server may be used to describe version information. Here, conversion or combination is expressed as conversion/combination.

The server may store the latest update time of fragments in a version number of the fragments or store the latest update time of fragments in a structure independent of the fragments.

When the latest update time of fragments is stored in a version number, to reduce the bandwidth consumed by the latest update time of fragments, the storage may be based on bit segments. Bit segmentation refers to separating a byte into multiple segments where each segment represents a different meaning. To store time information in bit segments is to store different measurements of time, such as year, month, date, hour, minute and second, in different bit segments. Preferably, the Modified Julian Date (MJD) or Network Time Protocol (NTP) format may be used.

If the latest update time of fragments is stored in a structure independent of the fragments, an array may be constructed for implementation. Preferably, a two-dimensional array may be used, which may include IDs and the latest update time of all fragments so that the latest update time of a fragment can be found via the ID of the fragment. Although exemplary modes are described in the above embodiment of the disclosure, the representation of the latest update time of fragments is not limited to the foregoing modes.

The following describes specific procedures of the method for updating an ESG through two preferred embodiments of the disclosure.

EMBODIMENT 2

Figure 4:
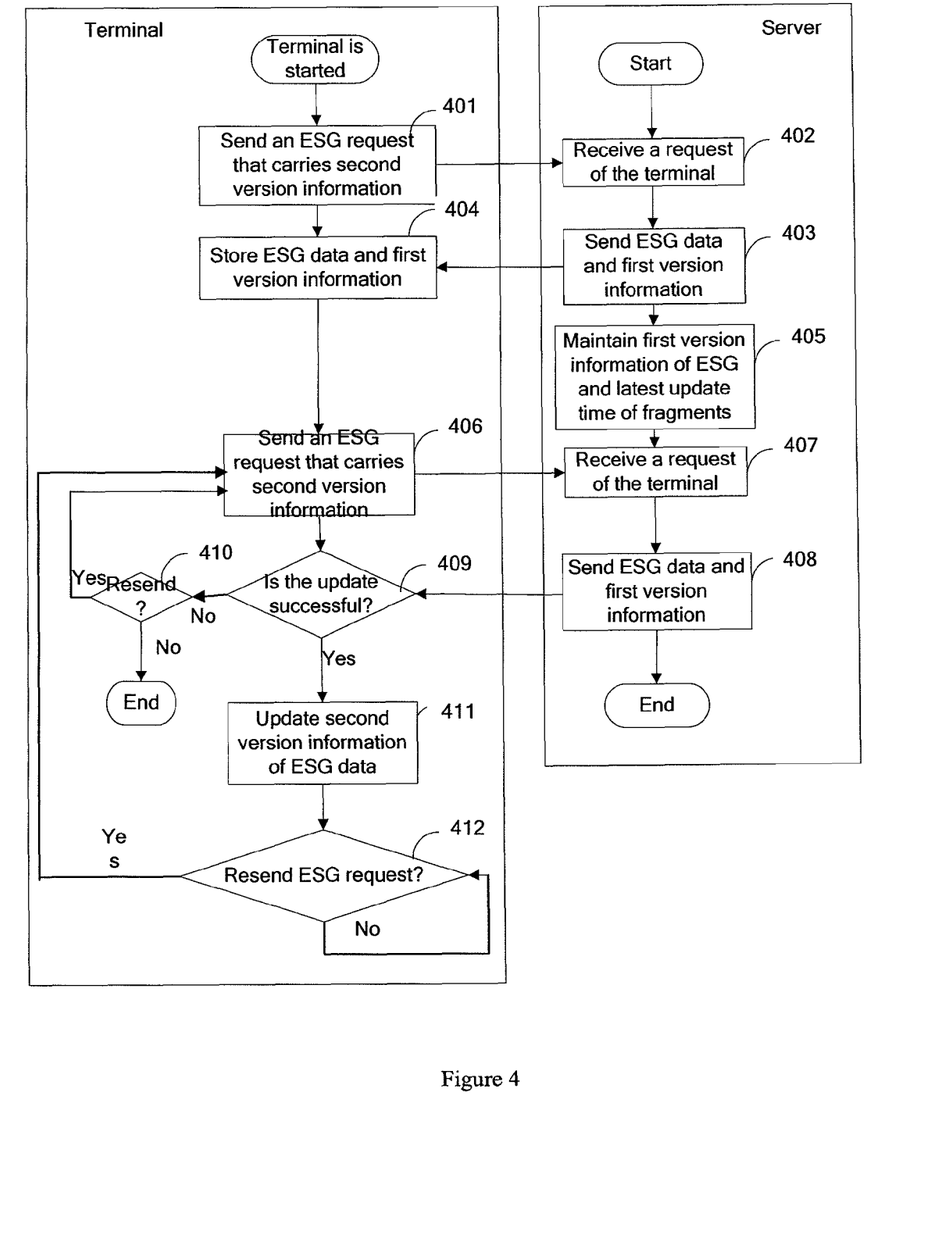
FIG. 4 shows the procedure of a method for updating an ESG according to a second embodiment of the disclosure.

FIG. 4 shows the procedure of a method for updating an ESG according to a second embodiment of the disclosure. As shown in FIG. 4, the method includes processing performed at the terminal and processing performed at the server. Specifically, the method includes the following steps:

Step 401: After a terminal is started, the terminal sends an ESG request message carrying second version information to an ESG server.

As described above, the method may preset a default value for the second version information and use the default value as the second version information when the terminal requests an ESG from the server at a first time. In this embodiment, the ESG request message sent by the terminal to the server in step 401 carries this second version information. This second version information may be represented by 0 or any other special symbol.

In this embodiment, when the terminal sends the ESG request message to the server, the terminal may request an entire ESG or set a filter condition to request ESG data that meets the filter condition. The filter condition may be personal preferences of the user or indicate whether to use personal information. When the filter condition is set to "All" or no filter condition is set, the filter condition is regarded as a special filter condition, indicating all valid fragments are requested.

In this step, if a filter condition is set in the ESG request message, the terminal should store the set filter condition.

Preferably, the terminal may initiate an ESG request message to the server by HTTP GET or other methods and place the filter condition in the ESG request message. The constructed ESG request message may be as follows:

GET/ESG? ServiceID=100 HTTP/1.1
Host: www.example.com
Content-Type:text/xml
Other message headers . . .

In the above message, the string after GET indicates the filter condition.

Step 402: The ESG server receives the ESG request message from the terminal.

Step 403: When the first version information maintained by the server is different from the second version information in the ESG request message, the server sends ESG data that is related to the ESG requested by the terminal and updated relative to the ESG corresponding to the second version information to the terminal and sends the first version information to the terminal.

In this step, the ESG server may filter fragments according to the filter condition in the ESG request message of the terminal to obtain ESG data that meets the filter condition. In this step, because the second version information is for requesting all ESG data, the server sends all ESG data that meets the filter condition, that is, the entire ESG, to the terminal.

Step 404: The terminal receives and stores the ESG data and the first version information from the ESG server.

In this step, the terminal may store the received ESG data as a file and replace the second version information with the first version information. The terminal may store the second version information by recording the second version information as a file attribute in a file that stores the ESG data or store the second version information in a file independent of the file that stores the ESG data. For example, a text file or an OTA DD file that is independent of the file that stores the ESG data may be used to store the second version information.

Step 405: When ESG data in the server is updated, the server maintains the first version information of the ESG and the latest update time of fragments.

As described above, version information or latest update time of the ESG, that is, the first version information, may be represented by the absolute time of the server, a conversion/combination of the absolute time of the server, or a symbol that identifies a new or old version. Here, to simplify the complexity in maintaining the first version information of the ESG by the server, the latest update time of fragments in the ESG may be used to indicate the first version information of the ESG.

In this step, when the first version information and the second version information are indicated by the absolute time of the server or a conversion/combination of the absolute time of the server, the method for the server to maintain the latest update time of fragments is described below.

If a fragment changes, the latest update time of the fragment is modified to the current absolute time of the server or a conversion/combination of the current absolute time of the server;

If a fragment is added, the latest update time of the fragment is recorded as the current absolute time of the server or a conversion/combination of the current absolute time of the server; and If a fragment is deleted, the latest update time of the fragment is recorded as the current absolute time of the server or a conversion/combination of the current absolute time of the server.

The server may maintain the update time of a fragment in the version number of the fragment, or in a structure that is independent of the fragment.

Step 406: The terminal sends an ESG request message carrying second version information to the ESG server.

In this step, the terminal may initiate the ESG request message to the server using the second version information stored in step 404. If a filter condition is set in the ESG request message sent in step 401, the filter condition should be carried in the ESG request message in this step so as to ensure that the server returns ESG data that meets the filter condition set by the terminal and is updated after the time corresponding to the second version information.

Preferably, the terminal may initiate the ESG request message to the server using HTTP GET or any other method and place the filter condition in the update request. The constructed ESG request message may be as follows:

GET/ESG? ServiceID=100&changedAfter=T1 HTTP/1.1
Host: www.example.com
Content-Type:text/xml
Other message headers . . .

In the above message, the string after GET indicates the filter condition. The changedAfter parameter is set to T1, indicating the need to judge whether a fragment is updated after time T1.

Step 407: The ESG server receives the ESG request message carrying the second version information from the terminal.

Step 408: When the first version information maintained by the server is different from the second version information in the ESG request message, the server sends ESG data that is related to the ESG requested by the terminal and updated relative to the ESG corresponding to the second version information to the terminal and sends the first version information to the terminal.

In this step, if the ESG request message carries not only version information but also a filter condition, the ESG server may first determine ESG data that meets the filter condition. Then among the ESG data that meets the filter condition, the server may send fragments that are updated relative to fragments in the ESG corresponding to the second version information carried in the ESG request message to the terminal.

The updated fragments are fragments that are changed, added, and/or deleted after the absolute server time corresponding to the second version information carried in the ESG request message.

For fragments that are deleted after the absolute server time corresponding to the second version information, the server may further construct a list of deleted ESG fragments according to the deleted fragments and send the list of deleted ESG fragments to the terminal or identify that these fragments are deleted when sending these deleted fragments to the terminal.

Step 409: Whether the update is successful is judged and if successful, the process goes to step 411, or else, goes to step 410.

In this step, if the update fails, for example, when the server cannot be connected or the server gives no response, the terminal continues storing the previously stored second version information as the version information parameter for the next ESG request message.

Step 410: Whether to resend the ESG request message is judged and if so, the process goes to step 406, or else, the update ends.

In this step, the terminal may resend the ESG request message at any time as needed by the user, or the terminal may resend the ESG request message at preset fixed time points, or at fixed time intervals, or according to a binary regression algorithm.

Step 411: When the update succeeds, the terminal overwrites the previously stored ESG data and the second version information with the received ESG data and the first version information. When the terminal initiates an ESG request message at the next time, the terminal may initiate an update according to the updated second version information.

Step 412: Whether to resend the ESG request message is judged and if so, the process goes back to step 406. Otherwise, cyclic judgment is made or another judgment is made after waiting for certain time.

Now, the procedure for updating an ESG in the second embodiment of the disclosure is completed.

In the technical solution disclosed in the second embodiment of the disclosure, the ESG server maintains the first version information of ESG data and sends version information of the ESG currently maintained by the server along with ESG data to the terminal. When the ESG server receives an ESG request message carrying second version information from the terminal, the ESG server compares the first version information with the second version information and if the first version information differs from the second version information, the ESG server sends the first version information and the ESG data that is related to the ESG requested by the terminal and updated relative to the ESG corresponding to the second version information to the terminal. Thus, the ESG server only sends ESG data that is updated to the terminal in the ESG update process so that ESG update is more specific and the processing load of the terminal is reduced.

In step 403 and step 408 in the foregoing embodiment, after the ESG server determines ESG data to be sent to the terminal, the ESG server may send all ESG data to the terminal at one time according to the prior art. However, when there are many fragments or contents in the ESG data, the defects described below exist when the server sends all fragments at one time:

When there are many contents in the ESG, the server has to send a message that contains a large amount of data to the terminal at one time. This will greatly increase the possibility of transport errors and reduce the reliability and efficiency of transport. In addition, when a response message returned by the server is large, the processing capability of the terminal will be impacted. Moreover, the terminal will not process the message and display the contents to the user until all the contents of the response message are received. As a result, the display delay is long and the processing efficiency is low.

Considering the above transport efficiency and reliability factors, when the server determines that the number of fragments is large, preferably, a multi-transport method may be adopted to send the fragments to the terminal.

For description purposes, hereinafter, all fragments that meet the filter condition and the version information as determined by the server are referred to as to-be-sent fragments. The multi-transport method is as follows: after the server determines the to-be-sent fragments, the server constructs a to-be-sent fragment list using the fragment information of all the determined fragments and sends the list to the terminal; the terminal determines fragments required by the terminal according to the to-be-sent fragment list and requests the fragments required by the terminal from the server; the server sends the fragments required by the terminal according to the request of the terminal to the terminal at multiple times.

In the above multi-transport method, the to-be-sent fragment list includes at least a fragment information list, which includes at least the ID and version number of each to-be-sent fragment.

Preferably, the method for the terminal to determine fragments required by the terminal according to the to-be-sent fragment list is as follows: the terminal determines a fragment that the terminal does not have as a required fragment according to the to-be-sent fragment ID in the fragment information list; or the terminal determines a fragment that is already stored by the terminal, of which the version number is inconsistent with the version number of the to-be-sent fragment in the fragment information list as a required fragment.

After the terminal obtains the to-be-sent fragment list and determines the fragments required by the terminal, the embodiment of the disclosure provides two methods for the terminal to request the required fragments from the server. One method includes the terminal sending multiple fragment request messages and specifying a required fragment in each fragment request message.

The other method includes the terminal sending one fragment request message to the server, telling the server about fragment information of the fragments already stored by the terminal or fragment information of the fragments that the terminal does not have, and the number of fragments the terminal requests the server to return. The server decides which fragments to send to the terminal. Every time the terminal receives a fragment from the server, the terminal sends an acknowledgment message to the server.

The following details how multi-transport of fragments is implemented in the ESG update solution in an embodiment of the disclosure.

EMBODIMENT 3

Figure 5:
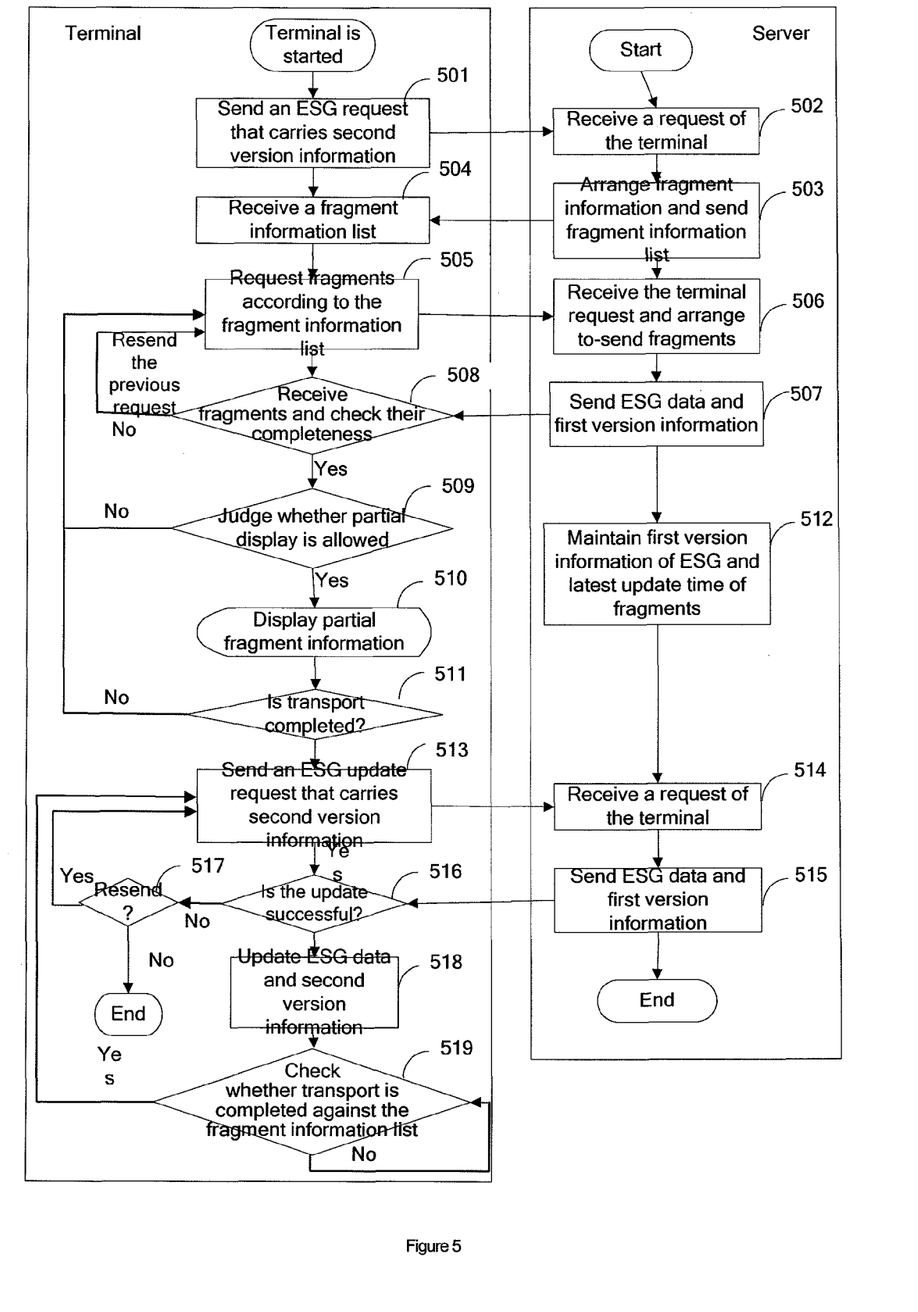
FIG. 5 shows the procedure of a method for updating an ESG according to a third embodiment of the disclosure.

FIG. 5 shows the procedure of a method for updating an ESG according to a third embodiment of the disclosure. As shown in FIG. 5, the method includes processing at the terminal and processing at the server. Specifically, the method includes the following steps:

Step 501: After a terminal is started, the terminal sends an ESG request message carrying second version information to an ESG server.

Step 502: The ESG server receives the request of the terminal.

Step 503: When the first version information of the ESG maintained by the server is different from the second version information in the ESG request message, the server determines to-be-sent fragments according to the request of the terminal, constructs a to-be-sent fragment list using fragment information of the to-be-sent fragments, and places the to-be-sent fragment list in the response message, and sends the response to the terminal.

In this step, the server may determine ESG data that is related to the ESG requested by the terminal and updated relative to the ESG corresponding to the second version information as to-be-sent fragments in the same way as in step 403 in the second embodiment of the disclosure.

In this step, the constructed to-be-sent fragment list may include any one or any combination of: the sum of to-be-sent fragments, a fragment information list, and the maximum number of fragments that the terminal may request each time.

The fragment information list may include any one or any combination of: the ID and version number of a to-be-sent fragment, start position of the fragment in the message, valid time of the fragment, fragment size, encoding format of the fragment, and fragment data. When the server decides to send all fragments to the terminal directly, the OffSet value indicates the start position of a fragment in the Fragment Data field.

In this embodiment, suppose the ESG requested by the terminal includes altogether five fragments and the server can send a maximum of two fragments to the terminal each time.

Then, the server may construct a fragment information list according to the structure shown in Table 1.

TABLE 1

| Field | Value |
|---|---|
| FragmentSum | 5 |
| FragmentInfoList | |
| FragmentID[0] | 1 |
| FragmentVersion[0] | 1.0 |
| ValidFrom | 200607082300 |
| ValidTo | 200607082400 |
| FragmentSize | 675 |
| FragmentEncoding | UTF-8 |
| FragmentID[1] | 3 |
| FragmentVersion[1] | 1.0 |
| ValidFrom | 200607082300 |
| ValidTo | 200607082400 |
| FragmentSize | 676 |
| FragmentEncoding | UTF-8 |
| FragmentID[2] | 2 |
| FragmentVersion[2] | 1.0 |
| ValidFrom | 200607082300 |
| ValidTo | 200607082400 |
| FragmentSize | 679 |
| FragmentEncoding | UTF-8 |
| FragmentID[3] | 4 |
| FragmentVersion[3] | 1.0 |
| ValidFrom | 200607082300 |
| ValidTo | 200607082400 |
| FragmentSize | 678 |
| FragmentEncoding | UTF-8 |
| FragmentID[4] | 5 |
| FragmentVersion[4] | 1.0 |
| MaxRequestNum | 2 |

The meaning of each field in the foregoing structure is described in Table 2.

TABLE 2

| Field | Meaning |
|---|---|
| FragmentSum | Total number of fragments, indicating the total number of to-be-sent fragments determined according to the current request. |
| FragmentInfoList | Fragment information list, composed of multiple fragment information records. |
| FragmentID[i] | ID of a fragment, composing the fragment information list with fragment version information. |
| FragmentVersion[i] | Version number of a fragment, composing the fragment information list with the fragment ID. |
| OffSet[i] | Start position of the fragment in the message. |
| ValidFrom[i] | Start time of the validity of the fragment, optional. |
| ValidTo[i] | End time of the validity of the fragment, optional. |
| FragmentSize[i] | Size of the fragment, optional. |
| FragmentEncoding[i] | Encoding format of the fragment, optional. |
| Other | Other information related to the fragment, optional. |
| MaxRequestNum | Maximum number of fragments that the terminal can request each time. |
| FragmentList | List of fragments, composed of multiple fragments. When the server determines that there are few fragment contents and that multiple transports are unnecessary, the server may send all the fragments at one time. |
| Fragment data[i] | Specific fragment information, compliant with the specifications in the prior art. |

When the server constructs the fragment information list, the server may sort the fragments according to the sequence of fragment IDs or another sequence. Preferably, the server may construct a fragment information list by sorting fragments related to a certain program in succession based on the reasoning described below.

One program is usually related to multiple fragments while IDs of the fragments related to the program may not be successive. For example, IDs of fragments related to program A may be 1 and 3, and IDs of fragments related to program B may be 2, 4, and 5. Therefore, when the server constructs a fragment information list, the server may sort fragment information in an order that facilitates processing of the terminal. As shown in Table 1, in this embodiment, fragments 1 and 3 related to program A are placed in succession and fragments 2, 4, and 5 related to program B are placed in succession instead of being arranged in a simple numeric order. Thus, if the terminal requests fragments according to the listing order, the terminal may quickly obtain all fragment information related to program A and display the program information for the user.

In addition, to control the number of fragments requested by the terminal at each time, the server may carry a MaxRequestNum parameter which indicates the maximum number of fragments that the terminal can request each time in the response message to the terminal. The parameter may be set to a static value or be dynamically adjusted according to the current network state or the processing state of the server. For example, the server may set MaxRequestNum in the current response message to 2 and set it to 10 in a next response message when the network state and the server state are good. The terminal may request a number of fragments within the MaxRequestNum.

In the embodiment of the disclosure, the server may decide whether multiple transports are necessary according to the number of to-be-sent fragment contents. If multiple transports are necessary, the server may send the fragments according to the method disclosed by the disclosure. If multiple transports are unnecessary, the server may place the to-be-sent fragments in the Fragment Data field in the FragmentList shown in Table 2 according to the specifications in the prior art and send the fragments to the terminal.

Step 504: The terminal receives and stores the to-be-sent fragment list from the ESG server.

Step 505: The terminal determines fragments required by the terminal according to the received to-be-sent fragment list and sends a fragment request to the ESG server.

In this step, the terminal may determine fragments the terminal does not have as fragments required by the terminal by checking information of fragments already stored locally against the fragment IDs in the fragment information list. Alternatively, the terminal may determine fragments already stored by the terminal of which the version number is inconsistent with the version number of fragments in the fragment information list as fragments required by the terminal according to the fragment IDs in the fragment information list. In this embodiment of the disclosure, because the terminal does not have any ESG fragment locally, the fragments required by the terminal are all fragments in the fragment information list.

The fragment request message may include a fragment list required by the terminal and/or the number of fragments requested by the message from the server. The fragment information list may include fragment ID and/or version information. The number of fragments requested by the message from the server cannot exceed the maximum number of fragments that the terminal may request each time.

In this embodiment, because the terminal does not have any ESG fragment locally, the terminal may request fragments 1 and 3 from the server according to the sequence of the fragment information list. The request message sent by the terminal to the server may be constructed according to the structure in Table 3.

TABLE 3

| Field | Value |
|---|---|
| FragmentInfoList | |
| FragmentID[0] | 1 |
| FragmentVersion[0] | 1.0 |
| FragmentID[0] | 3 |
| FragmentVersion[0] | 1.0 |
| FragmentSum | 2 |

The meanings of fields listed in Table 3 are described in Table 4.

TABLE 4

| Field | Meaning |
|---|---|
| FragmentInfoList | Fragment information list, composed of multiple fragment information records. |
| FragmentID[i] | ID of a fragment, composing the fragment information list with fragment version information. |
| FragmentVersion[i] | Version number of a fragment, composing the fragment information list with the fragment ID. |
| FragmentInfoList | Fragment information list, composed of multiple fragment information records. |
| FragmentSum | The number of fragments requested by the message from the server, which must be smaller than or equal to the MaxRequestNum in Table 2. |

In this step, the terminal may also request other fragments from the server but the number of requested fragments may not exceed the parameter MaxRequestNum.

Step 506: The server arranges to-be-sent fragments according to the terminal request.

In this step, the server checks the request received from the terminal to see whether the request carries a fragment list required by the terminal. If the request message carries a fragment list required by the terminal, the terminal has received the to-be-sent fragment list sent by the server and the fragments listed in the fragment list are fragments that the terminal requests from the server, and the server will arrange the to-be-sent fragments according to the request of the terminal. If the request message does not carry a fragment list required by the terminal, this request is the first request message sent by the terminal to the server, or if the terminal has not received the to-be-sent fragment list sent by the server, and then the server will send the to-be-sent fragment list to the terminal according to step 503.

Step 507: The server sends the fragments requested by the terminal and the first version information of the ESG maintained by the server to the terminal.

In this step, the first version information of the ESG maintained by the server is the current latest version information of the ESG, which may be the judgment condition for a next ESG update initiated by the terminal to the server.

In this step, the message via which the server sends fragments to the terminal may include any one or any combination of the number of fragments in the message, fragment information list and fragment list of the fragments carried in the message, maximum number of fragments the terminal can request each time, and/or invalid fragment list.

The fragment information list of fragments carried in the message includes any one or any combination of fragment ID and version number information, start position of a fragment in the message, and/or fragment size. The fragment list includes specific fragments. The invalid fragment list includes any one or any combination of IDs and version number information of invalid fragments. Here, fragments listed in the invalid fragment list are invalid fragments and therefore the terminal should request from the server fragments listed in the fragment information list and not listed in the invalid fragment list according to the fragment information list and the invalid fragment list.

In this embodiment, suppose the server determines that a maximum of three fragments can be sent in one message according to the current network state or the server state. Then, the server may set the MaxRequestNum parameter to 3 in the response message to the terminal. The response message sent by the server to the terminal may be constructed according to the structure shown in Table 5.

TABLE 5

| Field | Value |
| --- | --- |
| FragmentSum | 2 |
| FragmentInfoList | |
| FragmentID[0] | 1 |
| FragmentVersion[0] | 1.0 |
| OffSet[0] | 0X001 |
| Size[0] | 675 |
| FragmentID[1] | 3 |
| FragmentVersion[1] | 1.0 |
| OffSet[1] | 0X002 |
| Size[1] | 676 |
| FragmentList | |
| Fragment data[0] | Content of the fragment with FragmentID = 1 |
| Fragment data[1] | Content of the fragment with FragmentID = 3 |
| MaxRequestNum | 3 |

The meanings of fields listed in Table 5 are described in Table 6.

TABLE 6

| Field | Meaning |
| --- | --- |
| FragmentSum | Total number of fragments, the number of fragments carried in the message. |
| FragmentInfoList | Fragment information list, composed of fragment information of multiple fragments. |
| FragmentID[i] | ID of a fragment, composing the fragment information list with fragment version information. |
| FragmentVersion[i] | Version number of a fragment, composing the fragment information list with the fragment ID. |
| OffSet[i] | Start position of the fragment in the message. |
| Size[i] | Size of the fragment |
| FragmentList | List of fragments, composed of multiple fragments. |
| Fragment data[i] | Specific fragment information, compliant with the specifications in the prior art. |
| MaxRequestNum | Maximum number of fragments that the terminal can request each time. |
| FragmentInfoList | Invalid fragment information list, composed of information of multiple fragments. This list indicates fragments in the fragment information list that become invalid within the period from when the terminal receives the fragment information list to when the terminal requests fragments. This list is optional. |

TABLE 6-continued

| Field | Meaning |
| --- | --- |
| FragmentID[i] | ID of a fragment, composing the fragment information list with fragment version information. |
| FragmentVersion[i] | Version number of a fragment, composing the fragment information list with the fragment ID. |

Step 508: The terminal receives and stores the fragments and stores the received first version information as the new second version information. The terminal also checks the completeness and correctness of the received fragments according to the fragment request message sent to the server in step 505. If complete and correct fragments are received as requested, the procedure goes to step 509 or else, goes back to step 505 to resend the request previously sent to the server.

Step 509: The terminal judges whether it can display ESG fragments partially and if so, the procedure continues with step 510. Otherwise, the procedure goes back to step 505 to continue requesting fragments.

Step 510: The terminal displays partial ESG information to the user.

Step 511: The terminal judges whether all fragments required by the terminal are transported according to the fragment information list stored in step 508 and the fragments locally stored in the terminal and if the transport is not completed, the procedure goes to step 505 to continue requesting fragments.

Step 512: When an ESG fragment in the server is updated, the server maintains the first version information of the ESG and the latest update time of the fragment.

In this step, the method for the server to maintain fragment version information is the same as the method in step 405 in the second embodiment.

Step 513: The terminal sends an ESG request message carrying second version information to the ESG server.

Step 514: The ESG server receives the ESG request message carrying the second version information from the terminal.

Step 515: When the first version information maintained by the server is different from the second version information in the ESG request message, the server sends ESG data that is related to the ESG requested by the terminal and updated relative to the ESG corresponding to the second version information to the terminal and sends the first version information to the terminal.

Step 516: Whether the update is successful is judged, and if successful, the process goes to step 518, or else, goes to step 517.

Step 517: Whether to resend the ESG request message is judged and if so, go to step 513, or else, the update ends.

Step 518: When the update succeeds, the terminal overwrites the previously stored ESG data and the second version information with the received ESG data and the first version information. When the terminal initiates an ESG request message at the next time, the terminal may initiate an update according to the updated second version information.

Step 519: Whether to resend the ESG request message is judged and if so, the process goes back to step 513. Otherwise, cyclic judgment is made or another judgment is made after waiting for certain time.

Now, the procedure for updating an ESG in the third embodiment of the disclosure is completed.

In this embodiment, the server sends ESG data that meets the condition at multiple times to the terminal on the basis of the ESG update solution in the second embodiment. Therefore, the ESG update procedure is more specific and the processing load of the terminal is less. Moreover, the multi-transport method avoids the case that the server sends a message carrying a large amount of data to the terminal at one time so that the reliability and efficiency of transport are improved.

In the embodiments of the disclosure, the ESG server maintains the first version information of ESG data and sends version information of the ESG currently maintained by the server along with ESG data to the terminal. When the ESG server receives an ESG request message carrying second version information from the terminal, the ESG server compares the first version information with the second version information and if the first version information differs from the second version information, the ESG server sends the first version information and the ESG data that is related to the ESG requested by the terminal and updated relative to the ESG corresponding to the second version information to the terminal. Thus, the ESG server only sends ESG data that is updated to the terminal in the ESG update process so that ESG update is more specific and the processing load of the terminal is reduced.

In addition, in the ESG update solution provided by embodiments of the disclosure, it is the server instead of the terminal that judges whether ESG data is updated. This saves the power of the terminal, which benefits power sensitive hand-held terminals.

Although the disclosure has been described through several exemplary embodiments, the disclosure is not limited to such embodiments. It is apparent that those skilled in the art can make various modifications and variations to the disclosure without departing from the spirit and scope of the disclosure. The disclosure is intended to cover the modifications and variations provided that they fall in the scope of protection defined by the following claims or their equivalents

What is claimed is:

1. A method for updating an electronic service guide (ESG), comprising:
   receiving an ESG request message carrying second version information from a terminal;
   sending, according to the ESG request message, ESG data updated relative to an ESG corresponding to the second version information to the terminal;
   sending first version information which is maintained by a server to the terminal when the first version information is different from the second version information;
   wherein the ESG data updated relative to an ESG corresponding to the second version information comprises fragments in an ESG corresponding to the first version information updated relative to fragments in the ESG corresponding to the second version information,
   wherein the method further comprises maintaining latest update time of fragments;
   wherein the first version information is information of the latest update time of fragments in the ESG, and the maintaining latest update time of fragments comprises at least one of storing the latest update time of a fragment in a version number of the fragment and storing the latest update time of the fragment in a structure independent of the fragment;
   wherein maintaining latest update time of fragments comprises:
      modifying the latest update time of the fragment to current absolute time of the server or a conversion/combination of the current absolute time of the server, when a fragment is changed or deleted; and
      recording current absolute time of the server or a conversion/combination of the current absolute time of the server as the latest update time of the fragment when a fragment is added.

2. The method of claim 1, wherein the ESG data updated relative to an ESG corresponding to the second version information comprises:
   all fragments in an ESG corresponding to the first version information.

3. The method of claim 1, wherein the ESG request message carrying second version information contains a default value and wherein the step of sending, according to the ESG request message, ESG data comprises:
   sending all ESG data to the terminal according to the ESG request message when the ESG request message carrying second version information includes the default value.

4. The method of claim 1, wherein fragments that are updated relative to fragments in the ESG corresponding to the second version information comprises at least one of fragments that are changed after the absolute time of the server corresponding to the second version information, fragments that are added after the absolute time of the server corresponding to the second version information, and fragments that are deleted after the absolute time of the server corresponding to the second version information; the method further comprising:
   constructing a list of deleted fragments according to the fragments deleted after the absolute time of the server corresponding to the second version information and sending the list of deleted fragments to the terminal; or
   identifying the fragments that are deleted when sending the fragments deleted after the absolute time of the server corresponding to the second version information.

5. The method of claim 1, further comprising:
   constructing a to-be-sent fragment list according to fragment information of the ESG data when determining to send all ESG data to the terminal at multiple times;
   wherein the sending the ESG data to the terminal comprises: sending the to-be-sent fragment list to the terminal, and
   sending the fragments required by the terminal to the terminal at multiple times according to the request of the terminal.

6. A method for updating an electronic service guide (ESG), comprising:
   sending an ESG request message carrying second version information to a ESG server;
   receiving ESG data which is sent by the ESG server according to the ESG request message and is updated relative to an ESG corresponding to the second version information;
   receiving first version information which is maintained by the ESG server;
   wherein the ESG data which is updated relative to an ESG corresponding to the second version information comprises fragments in an ESG corresponding to the first version information updated relative to fragments in the ESG corresponding to the second version information;
   wherein the ESG server further maintains latest update time of fragments;
   wherein the first version information is information of the latest update time of fragments in the ESG; and the ESG server further stores the latest update time of a fragment in a version number of the fragment, or stores the latest update time of the fragment in a structure independent of the fragment, when maintaining latest update time of fragments;

wherein when maintaining latest update time of fragments, the ESG server further:

modifies the latest update time of the fragment to current absolute time of the ESG server or a conversion/combination of the current absolute time of the ESG server, when a fragment is changed or deleted; and records current absolute time of the ESG server or a conversion/combination of the current absolute time of the ESG server as the latest update time of the fragment when a fragment is added.

7. The method of claim 6, further comprising: storing the ESG data as a file and replacing a stored second version information with the first version information; wherein, the storing the second version information comprises at least one of:

recording the second version information as a file attribute in a file that stores the ESG data; and storing the second version information in a file independent of the file that stores the ESG data, wherein the file independent of the file that stores the ESG data is a text file or a download descriptor (DD) file.

8. The method of claim 6, wherein the ESG request message carries a filter condition; and the method further comprising:

storing the filter condition carried in the ESG request message after sending the ESG request message.

9. The method of claim 6, further comprising:

receiving a to-be-sent fragment list comprising at least a fragment information list, which comprises at least an ID and version number of each to-be-sent fragment; and determining fragments required by a terminal according to the to-be-sent fragment list.

10. The method of claim 9, wherein the determining fragments required by the terminal according to the to-be-sent fragment list comprises at least one of:

determining fragments that the terminal does not have as required fragments according to to-be-sent fragment IDs in the fragment information list; and determining fragments already stored by the terminal of which version numbers are different from version numbers of to-be-sent fragments in the fragment information list as required fragments.

11. An electronic service guide (ESG) server, comprising:

a version maintenance module, adapted to maintain first version information of an ESG;

a first communication module, adapted to receive an ESG request message carrying second version information;

a first request processing module, adapted to obtain ESG data updated relative to an ESG corresponding to the second version information according to the ESG request message and send the obtained ESG data and the first version information via the first communication module;

wherein the ESG data updated relative to an ESG corresponding to the second version information comprises fragments in an ESG corresponding to the first version information updated relative to fragments in the ESG corresponding to the second version information;

wherein the ESG server further comprises a fragment update time maintenance module, adapted to maintain latest update time of fragments;

wherein the first version information is information of the latest update time of fragments in the ESG, and the fragment update time maintenance module is further adapted to store the latest update time of a fragment in a version number of the fragment, or store the latest update time of the fragment in a structure independent of the fragment, when maintaining latest update time of fragments;

wherein when maintaining the latest update time of fragments, the fragment update time maintenance module is further adapted to:

modify the latest update time of the fragment to current absolute time of the ESG server or a conversion/combination of the current absolute time of the ESG server, when a fragment is changed or deleted; and record current absolute time of the ESG server or a conversion/combination of the current absolute time of the ESG server as the latest update time of the fragment, when a fragment is added.

12. The ESG server of claim 11, further comprising:

a first storage module, adapted to store fragments.

13. The ESG server of claim 12, wherein the first request processing module further comprises:

an update judgment unit, adapted to determine fragments that are changed, added, or deleted after the absolute ESG server time corresponding to the second version information as fragments updated relative to the ESG corresponding to the second version information according to the second version information in the ESG request message.

14. The ESG server of claim 11, further comprising:

a first fragment processing module, adapted to construct a to-be-sent fragment list according to fragment information of fragments obtained by the first request processing module and send the to-be-sent fragment list via the first communication module.

15. A terminal, comprising:

a second communication module adapted to generate an electronic service guide (ESG) request message carrying second version information and receive ESG data, which is sent by a ESG server according to the ESG request message, and is updated relative to an ESG corresponding to the second version information and a, which is maintained by the ESG server;

a second storage module, adapted to store the ESG data and the first version information;

wherein the ESG data updated relative to an ESG corresponding to the second version information comprises fragments in an ESG corresponding to the first version information updated relative to fragments in the ESG corresponding to the second version information;

wherein the ESG server further maintains latest update time of fragments;

wherein the first version information is information of the latest update time of fragments in the ESG; and the ESG server further stores the latest update time of a fragment in a version number of the fragment, or stores the latest update time of the fragment in a structure independent of the fragment, when maintaining latest update time of fragments;

wherein when maintaining latest update time of fragments, the ESG server further:

modifies the latest update time of the fragment to current absolute time of the ESG server or a conversion/combination of the current absolute time of the ESG server, when a fragment is changed or deleted; and records current absolute time of the ESG server or a conversion/combination of the current absolute time of the ESG server as the latest update time of the fragment when a fragment is added.

16. The terminal of claim 15, further comprising a filter condition storage module, wherein:
the second request processing module is adapted to generate an ESG request message carrying a filter condition and store the filter condition in the filter condition storage module and is adapted to place the filter condition in the ESG request message when sending the ESG request message.

17. The terminal of claim 15, wherein the second storage module is adapted to store the first version information in an independent text file or a download descriptor (DD) file.

18. The terminal of claim 15, further comprising a second fragment processing module, wherein:
the second communication module is adapted to receive a to-be-sent fragment list;
the second fragment processing module is adapted to query the second storage module according to the to-be-sent fragment list and determine fragments required by the terminal; and
the second request processing module is adapted to generate a fragment request message according to the fragments required by the terminal and send the fragment request message via the second communication module.

19. One or more non-transitory computer-readable media storing a program that includes instructions for updating an electronic service guide (ESG), the instructions causing a processor to:
receive an ESG request message carrying second version information from a terminal;
send, according to the ESG request message, ESG data updated relative to an ESG corresponding to the second version information to the terminal;
send first version information maintained by a server to the terminal when the first version information is different from the second version information;
wherein the ESG data updated relative to an ESG corresponding to the second version information comprises fragments in an ESG corresponding to the first version information updated relative to fragments in the ESG corresponding to the second version information;
wherein the instructions further causes the processor to maintain latest update time of fragments;
wherein the first version information is information of the latest update time of fragments in the ESG, and the instructions further causes the processor to store the latest update time of a fragment in a version number of the fragment, or store the latest update time of the fragment in a structure independent of the fragment, when maintaining latest update time of fragments;
wherein when maintaining latest update time of fragments, the instructions further cause the processor to:
modify the latest update time of the fragment to current absolute time of the server or a conversion/combination of the current absolute time of the server, when a fragment is changed or deleted; and
record current absolute time of the server or a conversion/combination of the current absolute time of the server as the latest update time of the fragment when a fragment is added.

20. One or more non-transitory computer-readable media storing a program that includes instructions for updating an electronic service guide (ESG), the instructions causing a processor to:
send an ESG request message carrying second version information to a ESG server;
receive ESG data sent by the ESG server according to the ESG request message and updated relative to an ESG corresponding to the second version information;
receive first version information maintained by the ESG server;
wherein the ESG data updated relative to an ESG corresponding to the second version information comprises fragments in an ESG corresponding to the first version information updated relative to fragments in the ESG corresponding to the second version information;
wherein the ESG server further maintains latest update time of fragments;
wherein the first version information is information of the latest update time of fragments in the ESG, and the ESG server further stores the latest update time of a fragment in a version number of the fragment, or stores the latest update time of the fragment in a structure independent of the fragment, when maintaining latest update time of fragments;
wherein when maintaining latest update time of fragments, the ESG server further:
modifies the latest update time of the fragment to current absolute time of the ESG server or a conversion/combination of the current absolute time of the ESG server, when a fragment is changed or deleted; and
records current absolute time of the ESG server or a conversion/combination of the current absolute time of the ESG server as the latest update time of the fragment when a fragment is added.

* * * * *

UNITED STATES PATENT AND TRADEMARK OFFICE
CERTIFICATE OF CORRECTION

PATENT NO. : 8,065,704 B2
APPLICATION NO. : 12/345194
DATED : November 22, 2011
INVENTOR(S) : Jie Zhang et al.

It is certified that error appears in the above-identified patent and that said Letters Patent is hereby corrected as shown below:

In column 20, claim 15, line 40, after "second version information and" replace "a," with --a first version information,--.

Signed and Sealed this
Tenth Day of January, 2012

David J. Kappos
*Director of the United States Patent and Trademark Office*